CONTINUOUSLY PLAYING PHONOGRAPH

Filed April 29, 1950 2 SHEETS—SHEET 1

INVENTORS,
CHESTER M. SINNETT
& HERBERT BELAR
BY H. L. Newton
ATTORNEY

INVENTORS,
CHESTER M. SINNETT
& HERBERT BELAR
BY
ATTORNEY

UNITED STATES PATENT OFFICE 2,617,893

CONTINUOUSLY PLAYING PHONOGRAPH

Chester M. Sinnett, Westmont, and Herbert Belar, Palmyra, N. J., assignors to Radio Corporation of America, a corporation of Delaware Application April 29, 1950, Serial No. 159,106

8 Claims. (Cl. 179—100.4)

Figure 1:
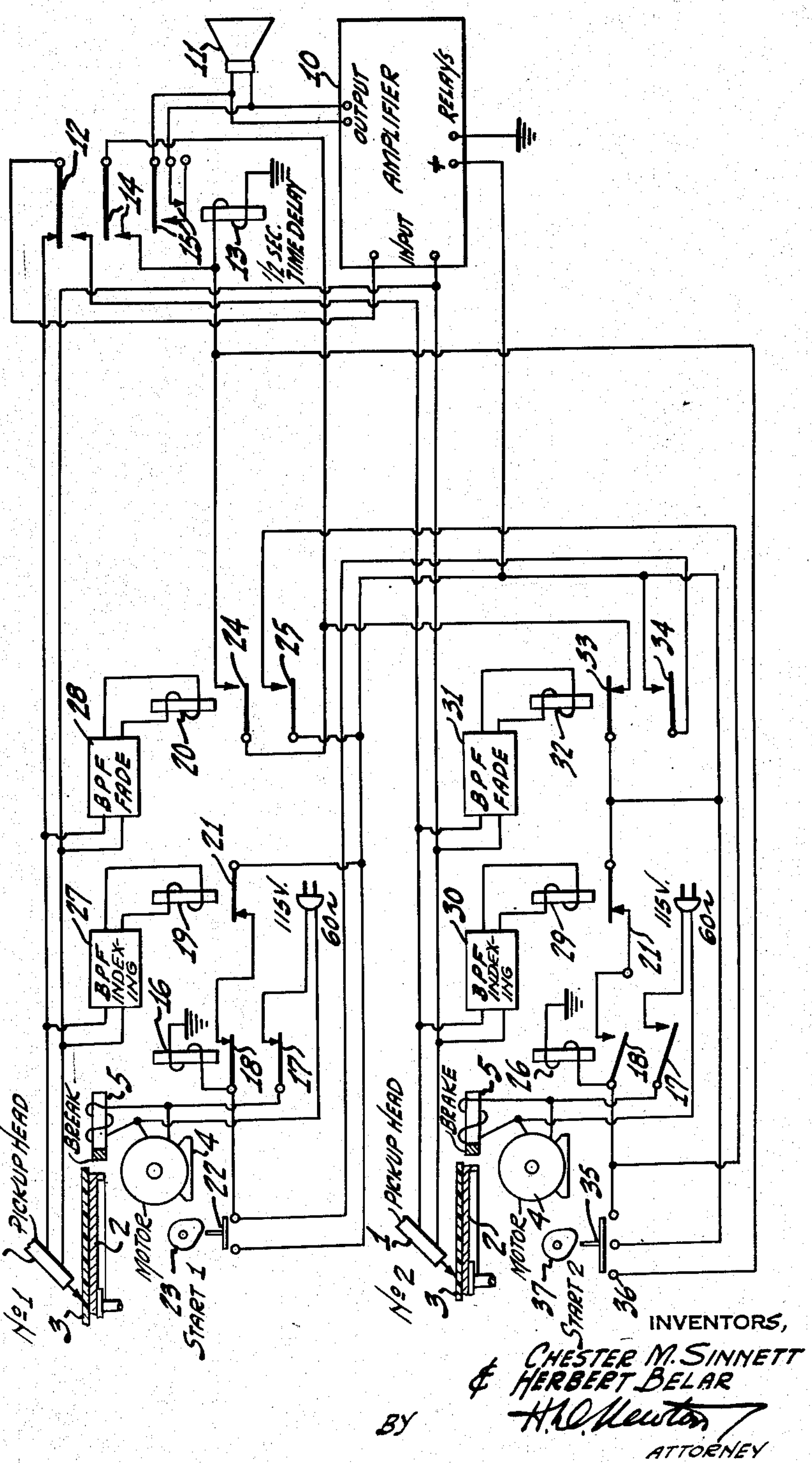

This invention relates to continuously playing phonographs and has for its principal object the provision of an improved apparatus and method of operation whereby one phonograph is put out of operation and another phonograph is put into operation automatically and without appreciable time delay between the sound records reproduced by the two phonographs.

In achieving this result, use is made of indexing signals and fade signals recorded, respectively, predetermined distances before the beginning and before the end of the sound record. These signals are recorded in the form of either supersonic or subaudible frequency impulses, or as variations in the groove modulation depth of a lateral cut record or the like.

For controlling the various steps in transferring sound reproduction from one phonograph to another, relays are employed. These relays are tuned or otherwise made selective to the signal by which they are operated. The apparatus is preconditioned for the starting of sound reproduction by pressing of starting button switches each of which functions to energize the power control relay of a different phonograph so that the turntables of both phonographs are rotated until the indexing signals are reproduced from the records, thereby deenergizing the power relays and opening the circuits of the turntable motors. Starting of sound reproduction from either record is initiated by pressing of the corresponding starting button and, if the phonographs are of the automatic record changing type, the reproduction of sound from the records continues indefinitely.

Thus, if the record on the No. 1 phonograph is first played, the fade signal at the end of its sound record functions to energize the No. 1 fade relay which (1) closes the No. 2 power relay circuit, thereby starting the No. 2 phonograph, and (2) (at the same time) completes the circuit of a time delay relay by which the amplifier and loudspeaker are later disconnected from the No. 1 phonograph and connected to the No. 2 phonograph. This time delay relay is provided with a contact which completes a holding circuit for itself through contacts which are engaged only when the No. 2 fade relay is not energized by a fade signal from a record on the No. 2 phonograph.

When the No. 2 phonograph has finished playings its record, the No. 2 fade relay is energized, thereby (1) completing a circuit through which the No. 1 power relay is energized and the No. 1 phonograph is started, and (2) opening the holding circuit of the time delay relay and later switching the amplifier and loudspeaker to the No. 1 phonograph.

In order that this cycle of operation be continuous without an appreciable pause or overlap for an indefinite period, it is only necessary that the indexing signal and fade signal be properly positioned. Also, there may be associated with the loudspeaker a switch by which it is temporarily short circuited as the amplifier is switched from one phonograph to another.

Important objects of the invention are the provision of an improved sound reproduction apparatus whereby sound may be continuously reproduced from successive records without apparent interruption, and the provision of improved means for fading reproduced sound from one phonograph to another.

Figure 2:
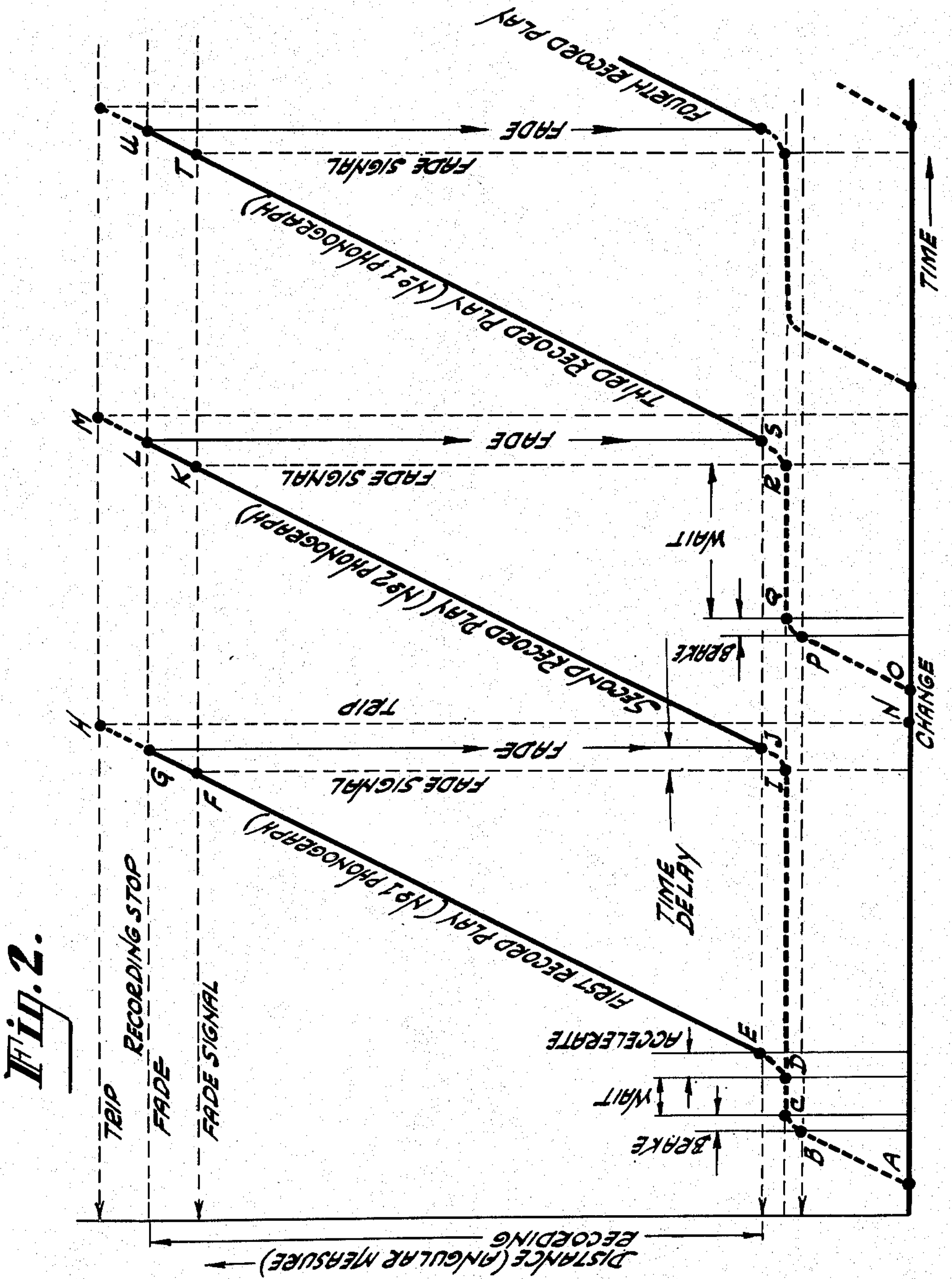

The invention will be better understood from the following description considered in connection with the accompanying drawings in which Figure 1 is a schematic circuit or wiring diagram of one form of improved sound reproducing apparatus according to our present invention, and Figure 2 is a graph showing the cycle of operation of our improved sound reproducing system in point of time.

Referring, first, to Figure 1, the apparatus includes No. 1 and No. 2 phonographs each of which is diagrammatically shown as including a pickup head 1, a turntable 2 for supporting one or more records 3, a turntable drive motor 4 and a brake 5 for cooperating with the turntable. The brake 5 is designed to be set when the motor is not energized and released when power is furnished to the motor.

Also forming a part of the apparatus is an audio frequency amplifier 10 and a loudspeaker 11. Connected to the input of the amplifier 10 is a switch blade 12 which, in its upper closed position, connects the amplifier 10 to the No. 1 pickup head and, in its lower closed position, connects the amplifier 10 to the No. 2 pickup head.

The switch 12 is biased to its upper closed position and is moved from this position to its lower closed position only in response to excitation of a time delay relay coil 13. Excitation of the coil 13 also functions to complete, through contacts 14, a holding circuit for the coil 13 and to briefly short circuit the loudspeaker 11 through the contacts 15.

The No. 1 phonograph is provided with a power supply control relay 16 having a switch element 17 which controls the supply of current to the No.

1 turntable motor and a switch element 18 which controls a holding circuit for the relay coil.

Connected to the No. 1 pickup head are an indexing relay 19 and a fade relay 20. The indexing relay 19 has a switch blade 21 which (1) cooperates with the switch blade 18 to complete the holding circuit of the power supply relay 16 when the indexing relay 19 is not energized by an indexing signal, and (2) serves to interrupt this holding circuit and stop the No. 1 motor when the indexing relay is energized. The No. 1 motor is always started in response to closure of a start switch 22 either manually or in response to a member 23 forming a part of the record change mechanism.

The fade relay 20 has one switch blade 24 which completes the circuit of the time delay relay coil 13 in response to a fade signal reproduced before the end of the sound record on the No. 1 turntable. The fade relay 20 also has another switch blade 25 which completes a circuit for the No. 2 power supply relay 26 for starting the No. 2 motor.

Suitable filter units 27 and 28 may be interposed in the circuits of the No. 1 indexing and fade relays for selectively transmitting the indexing and fade signals to these relays. This selectivity may be based on a difference in frequency or on other distinguishable characteristics.

The No. 2 power supply relay 26 is similar in all respects to the No. 1 relay 16. The No. 2 indexing relay 29 and filter unit 30 are likewise similar to the No. 1 relay 19 and filter 27. The No. 2 fade relay filter 31 is similar to the No. 1 filter 28 but certain differences of the No. 2 fade relay 32 should be noted. It will be observed that the relay 32 has one switch blade 33 which, together with the switch 14 of the time delay relay, completes a holding circuit of the time delay relay when the fade relay 32 is not energized. The No. 2 fade relay also has another switch blade 34 which completes a circuit for energizing the No. 1 power supply relay 16 when the No. 2 fade relay 32 is energized, at which time the holding circuit of the relay 13 is broken at the switch 33, thereby allowing (1) the switch blade 12 to move to its upper closed position, (2) the switch 14 to open, and (3) the loudspeaker 11 to be temporarily short circuited. The effect of this sequence of switching operations is to transfer sound reproduction from the No. 2 to the No. 1 unit.

The No. 2 start button 35 is similar to the No. 1 start button 22 with the exception that it includes a third contact 36 through which the relay 13 is operated to connect the amplifier 10 to the No. 2 phonograph and to complete its holding circuit whenever sound reproduction from the No. 2 unit is to follow. The start button 35 may be operated manually or by a member 37 which forms part of the record changing mechanism of the No. 2 phonograph.

Operation of the apparatus is initiated by closing the start button switches 22 and 35 either manually, or automatically in response to operation of the automatic record changer mechanism. In either case, the control is such that the records are rotated until the indexing signal is received by the relay 19 or 29 at which point the phonographs stop and remain stationary until their start button switches are temporarily closed again.

Assuming that both phonographs have been brought to rest in response to an indexing signal and that the No. 1 unit is to be operated first, the start button 22 is closed temporarily and the record is played until the fade signal section of the record is reached. When the fade signal is received by the relay 20, the switches 24 and 25 are closed. Closing of the switch 24 energizes the relay 13 so that the amplifier connections are switched from the No. 1 to the No. 2 unit. Closing of the switch 25 energizes the No. 2 power supply relay 26 thereby transferring sound reproduction to the No. 2 unit. The No. 2 record is played until its fade signal is received by the No. 2 fade relay 32. When this occurs, the switch 33 is opened, thus breaking the holding circuit of the relay 13, and the switch 34 is closed so as to energize the No. 1 power supply relay 16. This completes the cycle of operation.

As indicated above, the incoming record is always at the correct starting point when sound reproduction is transferred to it because of the proper choice of the positions of the indexing and fade signals thereon. The position of the indexing signal is ahead of the beginning of the recording. The angular distance between them is equal to or greater than that required to bring the turntable to a stop plus the time required to bring it up to speed. Once this distance is chosen, this fixes the distance between the fade signal and the end of the recording. The fade signal should be ahead of the end of the recording so the same time will elapse between the fade signal and the end of recording as was allowed to bring the record up to speed and to the start of recording. The requirement for equivalence of time is to be emphasized because the distances are not necessarily the same. The time delay relay must, of course, also be timed to the same time interval.

For example, if (1) a 45 R. P. M. record player can be stopped by means of the indexing signal in $\frac{1}{3}$ second from the time the signal is applied and the record turns $\frac{1}{8}$ revolution during this period, and if (2) it takes $\frac{1}{2}$ second to bring the record up to speed from the time the fade signal is applied and during this period the record turns 0.2 revolution, then the total time required to stop and start the record would be $\frac{1}{3}+\frac{1}{2}=\frac{5}{6}$ second, and the total angular distance would be $$\frac{1}{8}+0.2=0.325 \text{ revolution}$$

The angular distance between the indexing signal and the start of the music can therefore be set to 0.325 revolution. With this choice of the indexing signal position, the record would turn at normal speed until the indexing signal is reproduced 0.325 revolution ahead of the beginning of music or other recording. It would then be braked to a stop with $\frac{1}{8}$ of a revolution and come to rest with the pickup reproducing stylus 0.2 revolution ahead of the recording. Since, as was assumed for this particular example, the record requires 0.2 revolution and $\frac{1}{2}$ second to come up to speed, the fade signal will have to be located $\frac{1}{2}$ second before the end of the recording and the time delay relay set to $\frac{1}{2}$ second. During this period, the record travels at a constant speed of 45 R. P. M., so in $\frac{1}{2}$ second it will travel $\frac{3}{8}$ revolution. Therefore, the fade signal will have to be placed $\frac{3}{8}$ revolution ahead of the end of recording.

The calculation of the required position for the indexing and fade signals for any other turntable constants follow the same method illustrated by the above example. In all cases, the timing is so chosen so that the incoming record output is connected to the amplifier just as the recording begins and the outgoing record is disconnected just as the recording ends. The time interval between reproduction of both records is very brief and of the order of $\frac{1}{10}$ second or less, the intervening silent period being provided by the loudspeaker short circulating switch 15. With this arrangement, practically inaudible change-over between records can be provided.

Another way of showing the operation of the invention is by the graph of Figure 2. The operation of the record changer is shown against time, the ordinate being the distance expressed in angular measure. At point A, both turntables are started by pressing the respective starting buttons 22 and 35. At point B, both phonographs will produce the indexing signal, both motors become deenergized and brakes set. At point C, the turntables are at rest. The horizontal distance BC corresponds to the time required to bring the turntable to a stop, and the vertical distance BC represents the angular distance required to bring the turntable to a stop. From C to D, both turntables are waiting. At point D, turntable No. 1 has been started by pressing its starting button 22. During the time interval which is shown by the horizontal distance D and E, the turntable is accelerated. The distance through which it travels is expressed by the vertical distance from D to E. At point E, the recording starts and the first record continues to play. Eventually, this record reaches point F, at which an inaudible signal is reproduced causing the turntable of No. 2 phonograph to start accelerating at point I until it reaches normal speed at point J. The first record continues playing from F to G, and at point G the time delay relay operates and fades from the first to the second record. Turntable No. 1 continues rotating to point H at which time the terminal groove of the first record trips the mechanism to effect changing of records on No. 1 phonograph between points N and O. Turntable No. 1 continues to rotate from point O to point P at which time the indexing signal on the new record of No. 1 phonograph has come under the needle. This corresponds to the point B and is the point at which the brake of No. 1 phonograph is now applied to cause its turntable to stop at point Q. The No. 1 turntable then remains stationary until the point R, which corresponds to the point D, is reached. Meanwhile, from the point J on, the second record plays on turntable No. 2 and, at the point K, the above described cycle is repeated to effect transfer of playing to the No. 1 phonograph again for playing the third record, stopping of the No. 2 turntable with a new record thereon, and so on through the points S, T, U, etc.

What is claimed is:

1. The combination of a pair of sound record reproducing devices each including a turntable and a pickup device for reproducing sound from a record sound groove preceded by an indexing signal record groove and followed by a fade signal record groove, separate drive means for rotating said turntables, indexing signal responsive means for individually stopping rotation of said turntables precedent to said sound reproduction, and fade signal responsive means for subsequently transferring sound reproduction from one to another of said sound reproducing devices upon further rotation of said turntables.

2. The combination of a pair of sound record reproducing devices each including a turntable and a pickup device for reproducing sound from a record sound groove preceded by an indexing signal record groove and followed by a fade signal record groove, separate drive means for rotating said turntables, an audio frequency amplifier, indexing signal responsive means for individually stopping rotation of said turntables precedent to said sound reproduction, and fade signal responsive means for subsequently switching said amplifier from one of said pickup devices to the other following said sound reproduction from said one of the pickup devices.

3. The combination of a pair of sound record reproducing devices each including a turntable and a pickup device for reproducing sound from a record sound groove preceded by an indexing signal record groove and followed by a fade signal record groove, separate drive means for rotating said turntables, an audio frequency amplifier, indexing signal responsive means for individually stopping rotation of said turntables precedent to said sound reproduction, means for selectively restarting one of said turntables, and means responsive to a fade signal reproduced by one of said sound reproducing devices for subsequently starting rotation of the turntable of the other of said sound reproducing devices with predetermined time delay.

4. The combination of a pair of sound record reproducing devices each including a turntable and a pickup device for reproducing sound from a record sound groove preceded by an indexing signal record groove and followed by a fade signal record groove, separate drive means for rotating said turntables, an audio frequency amplifier, indexing signal responsive means for individually stopping rotation of said turntables precedent to said sound reproduction, and fade signal responsive means including a time delay relay for subsequently switching said amplifier from one to another of said sound reproducing devices upon further rotation of said turntables.

5. The combination of a pair of sound record reproducing devices each including a turntable and a pickup device for reproducing sound from a record sound groove preceded by an indexing signal record groove and followed by a fade signal record groove, separate drive means for rotating said turntables, an audio frequency amplifier, a loudspeaker connected to the output of said amplifier, indexing signal responsive means for individually stopping rotation of said turntables precedent to said sound reproduction, and fade signal responsive means for subsequently simultaneously short circuiting said loudspeaker and switching said amplifier from one to another of said pickup devices upon further rotation of said turntables.

6. The combination of a pair of sound record reproducing devices each including a turntable and a pickup device for reproducing sound from a record sound groove preceded by an indexing signal record groove and followed by a fade signal record groove, separate drive means for rotating said turntables, an audio frequency amplifier, a loudspeaker connected to the output of said amplifier, indexing signal responsive means for individually stopping rotation of said turntables precedent to said sound reproduction, fade signal responsive means including a time delay relay for subsequently switching said amplifier from one to another of said pickup devices, and means completing a holding circuit for said relay only when said amplifier is switched in one predetermined direction between said pickup devices.

7. The combination of a pair of sound record reproducing devices each including a turntable and a pickup device for reproducing sound from a record sound groove preceded by an indexing signal record groove and followed by a fade signal record groove, separate drive means for rotating said turntables, an audio frequency amplifier, indexing signal responsive means for individually stopping rotation of said turntables precedent to said sound reproduction, means for selectively restarting one of said turntables, means responsive to a fade signal reproduced by one of said sound reproducing devices for subsequently starting rotation of the turntable of the other of said sound reproducing devices and for switching said amplifier from one of said pickup devices to the other with predetermined time delay, and automatic trip means for restopping said one of said turntables following said switching.

8. The combination of a pair of sound record reproducing devices each including a turntable and a pickup device for reproducing sound from a record sound groove by an indexing signal record groove and followed by a fade signal record groove, separate drive means for rotating said turntables, indexing signal responsive means for individually stopping rotation of said turntables precedent to said sound reproduction, means for selectively restarting each of said turntables, automatic trip means for individually restopping said turntables, a sound amplifier selectively connectable to one or the other of said pickup devices, a loudspeaker device connected to said amplifier for reproducing amplified sound from said pickup devices, a time-delay relay device for effecting switching of said amplifier from one to the other of said pickup devices, band pass filter means directly connected in circuit with each of said pickup devices and having operating means whereby said relay device is energized in response to a fade signal from one of said pickup devices and is deenergized in response to a fade signal from the other of said pickup devices, thereby to transfer sound reproduction through said loudspeaker device from one to the other of said pickup devices.

CHESTER M. SINNETT.
HERBERT BELAR.

REFERENCES CITED

The following references are of record in the file of this patent:

UNITED STATES PATENTS

| Number | Name | Date |
|---|---|---|
| 1,834,886 | Barton | Dec. 1, 1931 |
| 1,909,765 | Jenkins | May 16, 1933 |
| 2,116,314 | Jenkins | May 3, 1938 |